(12) United States Patent
Elliott et al.

(10) Patent No.: US 7,815,867 B2
(45) Date of Patent: Oct. 19, 2010

(54) SMART ADDITION SYSTEM

(75) Inventors: Eric Elliott, Wilkesboro, NC (US); Martin Evans, Tolland, CT (US)

(73) Assignee: Intercat Equipment, Inc., Sea Girt, NJ (US)

( * ) Notice: Subject to any disclaimer, the term of this patent is extended or adjusted under 35 U.S.C. 154(b) by 583 days.

(21) Appl. No.: 11/835,347

(22) Filed: Aug. 7, 2007

(65) Prior Publication Data

US 2008/0050286 A1  Feb. 28, 2008

Related U.S. Application Data

(60) Provisional application No. 60/821,648, filed on Aug. 7, 2006.

(51) Int. Cl.
| | |
|---|---|
| *G05B 1/00* | (2006.01) |
| *B01J 19/00* | (2006.01) |
| *B01J 8/00* | (2006.01) |
| *B01J 10/00* | (2006.01) |
| *B01J 8/08* | (2006.01) |
| *G01N 1/00* | (2006.01) |
| *A61L 2/24* | (2006.01) |
| *F16K 31/00* | (2006.01) |
| *F27B 15/00* | (2006.01) |
| *C10G 35/10* | (2006.01) |
| *G05D 16/00* | (2006.01) |
| *G05D 7/00* | (2006.01) |

(52) U.S. Cl. ............... 422/105; 422/107; 422/108; 422/110; 422/112; 422/114; 422/119; 422/145; 422/187; 422/232; 208/146; 208/152; 208/153; 340/572.1

(58) Field of Classification Search ............... 422/105, 422/119, 187, 232, 107–108, 110, 112, 114, 422/145; 208/146, 152, 153; 340/272.1
See application file for complete search history.

(56) References Cited

U.S. PATENT DOCUMENTS

| | | | |
|---|---|---|---|
| 4,082,513 A | 4/1978 | Andon et al. | |
| RE32,101 E * | 4/1986 | Ricciardi et al. | ............... 222/56 |
| 4,660,881 A | 4/1987 | Komeya et al. | |
| 4,769,127 A | 9/1988 | Erickson et al. | |
| 4,782,427 A | 11/1988 | Marks | |
| 5,042,209 A * | 8/1991 | Furrer et al. | ............... 451/76 |
| 5,360,535 A | 11/1994 | Liu et al. | |
| 5,389,236 A | 2/1995 | Bartholic et al. | |

(Continued)

OTHER PUBLICATIONS

International Search Report and Written Opinion for PCT/US07/75240, Dec. 18, 2007.

(Continued)

*Primary Examiner*—Walter D Griffin
*Assistant Examiner*—Natasha Young
(74) *Attorney, Agent, or Firm*—Tanzina Chowdhury (57) ABSTRACT

An addition apparatus, a fluid catalytic cracking (FCC) system having an addition apparatus, and a method for adding material to an FCC unit are provided. In one embodiment, an addition system having the capability of interfacing with a material container is provided that allows the addition system to obtain information relating material held in the container. In one embodiment, at least some of the information is contained on a tag affixed to the container. Other information may be retrieved and/or sent to the addition system controller from a remote data source, such as a catalyst supplier.

10 Claims, 8 Drawing Sheets

U.S. PATENT DOCUMENTS

| | | |
|---|---|---|
| 5,810,045 A | 9/1998 | Evans |
| 6,358,401 B1 | 3/2002 | Evans |
| 6,616,899 B1 * | 9/2003 | Upson .................. 422/139 |
| 6,859,759 B2 | 2/2005 | Evans |
| 6,919,807 B2 * | 7/2005 | Shek et al. ............. 340/572.1 |
| 6,974,559 B2 | 12/2005 | Evans |
| 7,001,502 B1 | 2/2006 | Satchwell et al. |
| 7,050,944 B2 | 5/2006 | Evans |
| 7,369,959 B2 | 5/2008 | Evans |
| 7,560,078 B2 * | 7/2009 | Elliott et al. ............. 422/145 |
| 2001/0041117 A1 | 11/2001 | Comardo |
| 2003/0027713 A1 | 2/2003 | O'Connor et al. |
| 2003/0234171 A1 | 12/2003 | Ownen et al. |
| 2004/0117158 A1 | 6/2004 | Evans |
| 2004/0166032 A1 | 8/2004 | Evans |
| 2005/0040224 A1 | 2/2005 | Brinton et al. |
| 2005/0103684 A1 | 5/2005 | Evans |
| 2006/0140824 A1 | 6/2006 | Evans |

OTHER PUBLICATIONS

International Search Report and Written Opinion dated Feb. 19, 2009 for Application No. PCT/US2007/075240.
Prosecution history of U.S. Appl. No. 11/462,890 as of May 18, 2009.
Prosecution history of U.S. Appl. No. 11/462,882 as of May 18, 2009.
"IMS to Control Room", Dwg. S-29, Sheet 1, Intercat, Savannah, Georgia, Nov. 26, 2001.

* cited by examiner

SMART ADDITION SYSTEM

CROSS REFERENCE TO RELATED APPLICATIONS

This patent application claims benefit of U.S. Provisional Patent Application Ser. No. 60/821,648, filed Aug. 7, 2006, which is incorporated by reference in its entirety.

FIELD OF THE INVENTION

Embodiments of the invention generally relate to a fluid catalytic cracking system, and more specifically to an addition system suitable for use in a fluid catalytic cracking system.

DESCRIPTION OF THE RELATED ART

Figure 1:
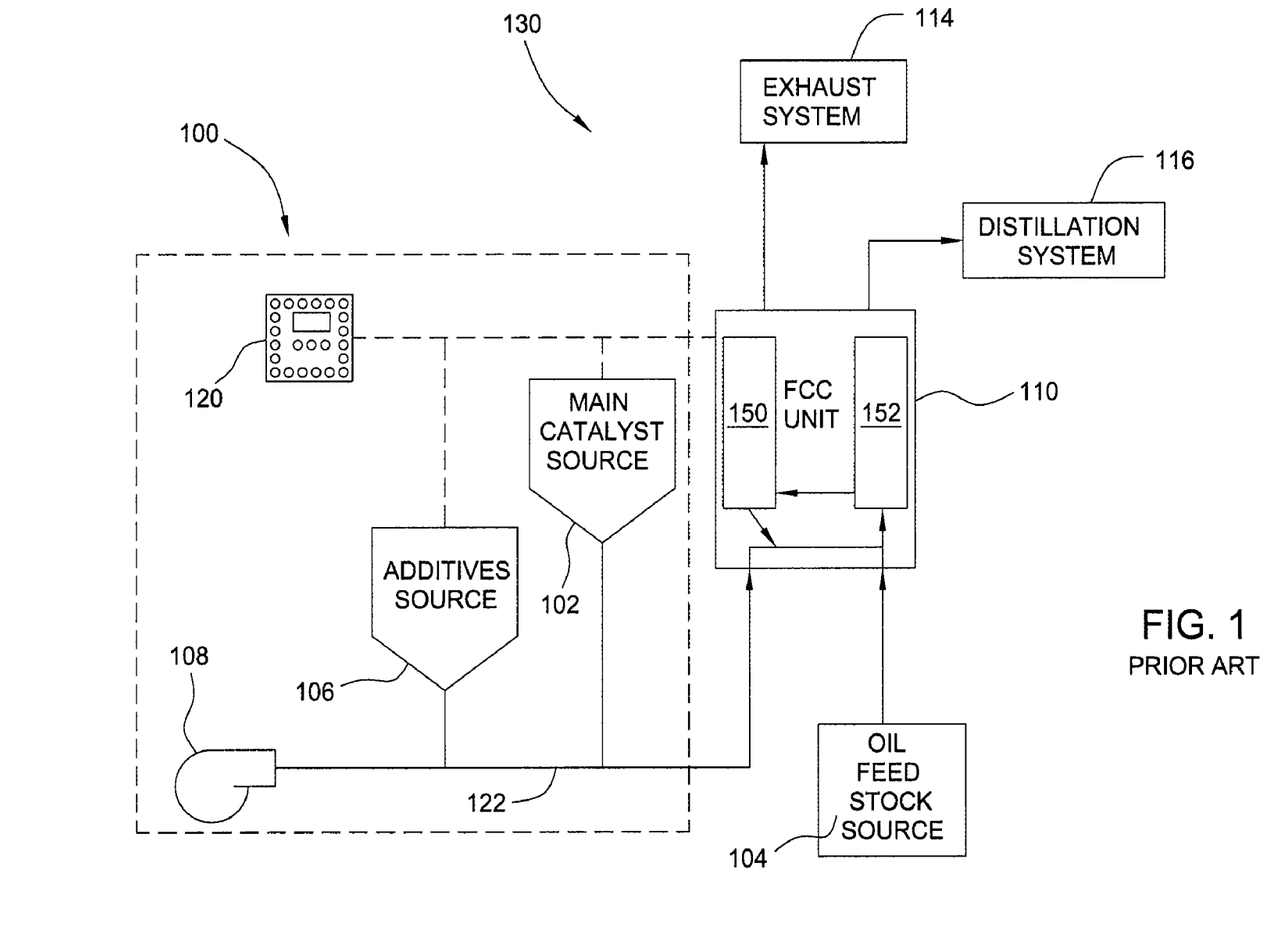
FIG. 1 is a simplified schematic view of a conventional fluid catalytic cracking (FCC) system.

FIG. 1 is a simplified schematic of a conventional fluid catalytic cracking system 130. The fluid catalytic cracking system 130 generally includes a fluid catalytic cracking (FCC) unit 110 coupled to a catalyst injection system 100, a petroleum feed stock source 104, an exhaust system 114 and a distillation system 116. One or more catalysts from the catalyst injection system 100 and petroleum from the petroleum feed stock source 104 are delivered to the FCC unit 110. The petroleum and catalysts are reacted in the FCC unit 110 to produce a vapor that is collected and separated into various petrochemical products in the distillation system 116. The exhaust system 114 is coupled to the FCC unit 110 and is adapted to control and/or monitor the exhausted by-products of the fluid cracking process.

The FCC unit 110 includes a regenerator 150 and a reactor 152. The reactor 152 primarily houses the catalytic cracking reaction of the petroleum feed stock and delivers the cracked product in vapor form to the distillation system 116. Spent catalyst from the cracking reaction is transferred from the reactor 152 to the regenerator 150 where the catalyst is rejuvenated by removing coke and other materials. The rejuvenated catalyst is reintroduced into the reactor 152 to continue the petroleum cracking process. By-products from the catalyst rejuvenation are exhausted from the regenerator 150 through an effluent stack of the exhaust system 114.

The catalyst injection system 100 maintains a continuous or semi-continuous addition of fresh catalyst to the catalyst inventory circulating between the regenerator 150 and the reactor 152. The catalyst injection system 100 includes a main catalyst source 102 and one or more additive sources 106. The main catalyst source 102 and the additive source 106 are coupled to the FCC unit 110 by a process line 122. A fluid source, such as a blower or air compressor 108, is coupled to the process line 122 and provides pressurized fluid, such as air, that is utilized to carry the various powdered catalysts from the sources 102, 106 through the process line 122 and into the FCC unit 110.

One or more controllers 120 is/are utilized to control the amounts of catalysts and additives utilized in the FCC unit 110. Typically, different additives are provided to the FCC unit 110 to control the ratio of product types recovered in the distillation system 116 (i.e., for example, more LPG than gasoline) and to control the composition of emissions passing through the exhaust system 114, among other process control attributes. As the controller 120 is generally positioned proximate the catalyst sources 106, 102 and the FCC unit 110, the controller 120 is typically housed in an explosion-proof enclosure to prevent spark ignition of gases which may potentially exist on the exterior of the enclosure in a petroleum processing environment.

In order to facilitate efficient operation of the FCC unit, the catalyst storage vessel at the refinery must be continually monitored to ensure an adequate amount of catalyst is readily available. Moreover, as conventional injection systems are hard-mounted to the FCC unit, refiners have little flexibility for expanding the number of catalysts that may be injected. For example, if a new catalyst is to be utilized, one injection system must be emptied of catalyst currently staged for delivery to the FCC unit in a storage vessel to facilitate switching to the new catalyst. Thus, conventional addition systems provide little inventory control or flexibility for adding and/or changing catalysts.

Furthermore, refiners may periodically replenish fines in the FCC unit using an emptied catalyst injection system presently coupled to the FCC unit to replenish the concentration of fines in the system with new (e.g., unused) fines provided by a catalyst vendor. This method is cumbersome for refiners, as an empty catalyst injection system is not always available, and the process operation may be temporarily disoptimized while fines instead of catalyst are in the injection system.

Since the types of catalysts utilized and concentration of fines directly effect process stability of the FCC unit, conventional addition systems may not be able to maintain the FCC unit at its optimal operating limits. As the FCC unit is a major profit center in most refineries, a great deal of time and investment is made by refineries to ensure that the FCC unit is always operating against its operating limits, thereby maximizing profitability. Anything that forces the operation of the FCC unit away from these limits reduces profitability to the detriment of the refiner. Thus, it would be highly desirable to stabilize the FCC operation by ensuring the continuous circulation of catalyst within the FCC unit, thus maintaining the dynamic balance of catalyst in the FCC unit.

Therefore, there is a need for an improved addition system.

SUMMARY OF THE INVENTION

An addition apparatus, a fluid catalytic cracking (FCC) system having an addition apparatus, and a method for adding material to an FCC unit are provided. Additionally, an addition system having the capability of interfacing with a material container is also provided. The interfacing capability allows the addition system to obtain information relating to a type of material held in the container, an amount of material disposed in the container, shipping weight of material disposed in the container, a tare weight of the container, a source or origin of material within the container, traceability information of material in the container, a current weight of material in the container, information relating to a unique container identification (such as a container serial number), the customer to which the container was shipped, purchase order information and/or material previously held in the container, among other information. In one embodiment, at least some of the information is contained on a tag affixed to the container. Other information may be retrieved and/or sent to the addition system controller from a remote data source, such as a catalyst supplier. Other addition systems, such as those described in U.S. Pat. No. 7,050,944 issued May 23, 2006 (CAT/004); U.S. Pat. No. 6,859,759 issued Feb. 22, 2005 (CAT/005); U.S. Pat. No. 6,974,559 issued Jan. 13, 2005 (CAT/006); U.S. patent application Ser. No. 10/717,250 filed Nov. 19, 2003 (CAT/008); U.S. patent application Ser. No. 10/717,249 filed Nov. 19, 2003 (CAT/009); U.S. patent application Ser. No. 11/184,125 filed Jul. 19, 2005 (CAT/013); and U.S. patent application Ser. No. 11/380,556 filed Apr. 27, 2006 (CAT/015), among others and including those from other manufacturers, may be adapted to incorporate an interfacing capability, such as a tag and reader, of the present invention. All of the above U.S. patent and patent applications are incorporated by reference in their entireties.

In one embodiment, an addition system for an FCC unit includes a container, a first eductor and a sensor. The eductor is coupled to an outlet of the container. The sensor is configured to detect a metric of material dispensed from the container through the eductor. A valve is provided for controlling the flow through the eductor. A controller is coupled to the sensor and valve. The controller provides a control signal for regulating an operational state of the valve.

In another embodiment, an FCC system having addition system is provided. The FCC system includes an FCC unit, a first eductor and a sensor. The FCC unit has a reactor and a regenerator. The first eductor has a material outlet coupled to the FCC unit. The sensor is configured to detect a metric of material dispensed to the FCC unit through the eductor. A valve is provided for controlling flow through the eductor. A controller is coupled to the sensor and valve. The controller provides a control signal for regulating an operational state of the valve.

In another embodiment, a method for adding material to an FCC unit is provided. The method includes providing a vessel containing a material under low pressure, moving the material through an eductor to the FCC unit, and determining an amount of material dispensed from the vessel through the eductor.

DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures. It is contemplated that features from any one embodiment may be beneficially incorporated in other embodiments without additional recitation.

DETAILED DESCRIPTION

The invention generally provides an addition system suitable for use in a fluid catalytic cracking (FCC) system and a method of using the same. Embodiments of the addition system may be utilized to inject one or more additives into an FCC unit. The additives may be catalyst, catalyst additives and/or fines. Some catalysts are utilized to drive the cracking reaction, others to control the distribution of product, while others to control emissions. For example, some common catalysts are at least one of Y-Zeolite containing catalyst, ZSM-5 containing catalyst, NOx reduction catalyst and SOx reduction catalyst, among others. Advantageously, the invention also facilitates tracking of the catalyst inventory along with providing the refiner with increased flexibility in selecting among variety of catalyst types with little or no disruption to the operation of the FCC system.

Figure 2:
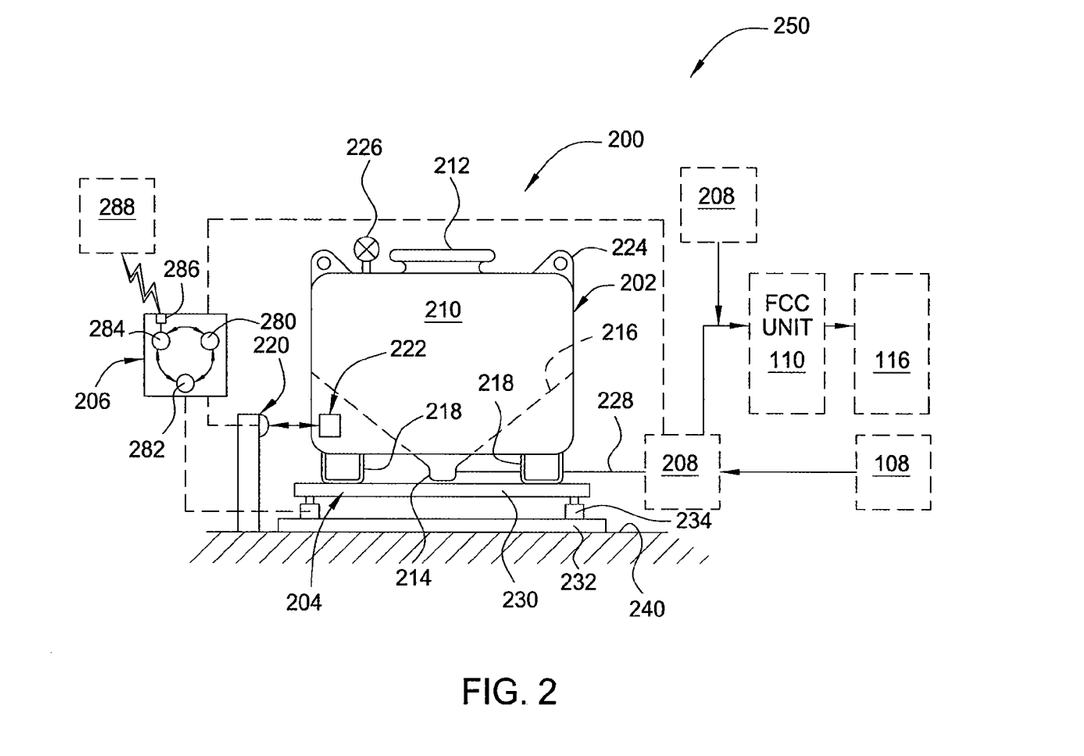
FIG. 2 is a simplified schematic diagram of an addition system in accordance with one embodiment of the present invention suitable for use with an FCC system.

FIG. 2 is a simplified schematic of a fluid catalytic cracking system 250 having one embodiment of an addition system 200 of the present invention. The fluid catalytic cracking system 250 generally includes a fluid catalytic cracking (FCC) unit 110 coupled to the addition system 200, a feed stock source 104, a distiller 116 and a controller 106. One or more catalysts from the addition system 200 and petroleum from the petroleum feed stock source 104 are delivered to the FCC unit 110. The petroleum and catalyst are reacted in the FCC unit 110 to produce a vapor that is collected and separated to various petrochemical products in the distillation system 116.

The FCC unit 110 includes a regenerator and a reactor, as known in the art. The reactor primarily houses the catalytic cracking reaction of the petroleum feed stock source and delivers the cracked product in vapor form to the distillation system 116. Spent catalyst from the cracking reaction is transferred from the reactor to the regenerator, where the catalyst is rejuvenated by removing coke and other materials. The rejuvenated catalyst is reintroduced into the reactor to continue the petroleum cracking process. By-products from the catalyst rejuvenation process are exhausted from the regenerator through an effluent stack.

The injection system 200 maintains a semi-continuous addition of fresh catalyst to the catalyst inventory circulating in the FCC unit 110. The addition system 200 includes a container 202, a sensor 204 and a transfer controller 208. The sensor 204 and the transfer controller 208 are coupled to the controller 206 so that the delivery of additives to the FCC unit 110 may be regulated.

The sensor 204 provides a metric indicative of an amount of catalyst transferred from the container 202 to the FCC unit 110 through the transfer controller 208. The metric may be in the form of level, volume and/or weight. For example, the sensor 204 may provide a metric indicative of the weight of the additives in the container 202. Sequential weight information may be utilized to determine the amount of additives dispensed from the container 202. In another embodiment, the sensor 204 may provide a metric indicative of the volume of additives in the container 202. In yet another embodiment, the sensor 204 may provide a metric indicative of the additives passing through a hose 228 connecting the container 202 to the transfer controller 208.

In the embodiment depicted in FIG. 2, the sensor 204 is a weight measuring device. Information regarding the weight of the container is obtained by the sensor 204 and is utilized by the controller 206 to determine a metric indicative of the weight of catalyst, fines or additive in the container 202. The catalyst or fines dispensed from the container may be determined by at least one of weight gain or weight loss computation.

The sensor 204 depicted in FIG. 2 includes a platform 230 for supporting the container 202 thereon. A plurality of load cells 234 are disposed between the base 232 of the sensor 204 and the platform 230. The load cells 234 are coupled to the controller 206 so that an accurate measurement of the weight of the container 202 (and thereby the amount of catalyst, additive or fines disposed therein) may be readily obtained.

The base 232 is generally supported on a surface 240. The surface 240 may be a concert slab or other foundation. It is also contemplated that the base may be another suitable surface or structure.

The container 202 generally includes a storage vessel 210 having a fill port 212, an outlet port 214 and an optional vent port 226. The vessel 210 may be permanently affixed to the sensor 204 or removably disposed thereon. In the embodiment depicted in FIG. 2, the storage vessel 210 is removably disposed on the sensor 204.

The storage vessel 210 may be filled with catalyst delivered to the facility in another container or the storage vessel 210 may also be a shippable container, such as a tote. To facilitate movement of the storage vessel 210, the storage vessel may include lift points 224 for coupling a lift thereto. The storage vessel may alternatively include legs 218 that space a bottom 216 of the storage vessel 210 from the platform 230 to provide space for the outlet port 214 and associated conduits coupled thereto. In one embodiment, the legs 218 may be configured to receive the fork of a lift truck to facilitate removal and replacement of the storage vessel 210 of the platform 230 of the sensor 204.

The fill port 212 is generally disposed on or near the top of the storage vessel 210. The outlet port 214 is generally disposed at or near the bottom 216 of the vessel. The bottom 216 may have a funnel shape so that additives disposed in the storage vessel 210 are directed by gravity to the outlet port 214. The bottom 216 may have a substantially conical or inverted pyramid shape.

The storage vessel 210 may be fabricated from any material suitable for holding and/or shipping catalyst or fines. In one embodiment, the storage vessel 210 is fabricated from metal. In another embodiment, the storage vessel 210 is fabricated from a wood or plastic product, such as corrugated cardboard. It is contemplated that since the atmosphere within the storage vessel 210 is maintained at or near atmospheric pressure, the materials utilized to fabricate the storage vessel 210 do not have to withstand the high pressures associated with conventional catalyst storage vessels, which typically operate at about five to 60 pounds per square inch (about 0.35 to about 4.2 kilograms per centimeter squared ($cm^2$)). As such, the pressure vessel 210 may be configured to have a maximum operating pressure of less than about five pounds per square inch. It is also contemplated that the storage vessel 210 may be configured for operation at pressures up to about 60 pounds per square inch if desired.

A tag 222 is fixed to the container 202 and contains information relating to the material stored inside. The tab 222 may be a bar code, memory device or other suitable medium for information storage. In one embodiment, the tag 222 may read via RF, optical or other wireless method. In another embodiment, the tag 222 may be a read/writable memory device, such that changes to the material present in the container 202 may be updated after various events. For example, the tag 222 may include information regarding the amount of material inside the container 202. After material is dispensed and/or added to the container 202, the information stored on the tag 222 may be updated by the controller 206 to reflect the current status of amount of material in the container 202. Thus, if the container 202 is temporarily removed from the addition system 200, the amount of material within the container 202 is known and will not have to be rechecked upon return to the system 200.

The tag 222 may contain information relating to the type of material in the container, an amount of material in the container, shipping weight of material in the container, a tare weight of the container, a source or origin of material within the container, traceability information of material in the container and/or a current weight of material in the container. The tag 222 may also contain information relating to a unique container identification (such as a container serial number), the customer to which the container was shipped, purchase order information and/or material previously held in the container.

The addition system 200 may also includes a reader 220 positioned to interface with the tag 222 when the container 202 is disposed on the system 200. The reader 220 may be coupled to the controller 206 either by downloading information form the reader memory, wireless transmission and/or hardware communication. In one embodiment, the reader 220 is RF reader. In other embodiment, the reader 220 may provide tag information to the controller 206 that includes the identification number of the container 202. The controller 206 may obtain information associated with the container (and additives therein) from the controllers memory, or by communicating with a separate data base, such as at the refinery or at the additive vendor. Information may be downloaded to the controller 206 periodically, or received in response to a request from the controller 206. In another embodiment, it is contemplated a technician may enter tag 222 information directly into the controller 206.

In one embodiment, it is contemplated a technician may enter tag 222 information directly into the controller 206.

Figure 3:
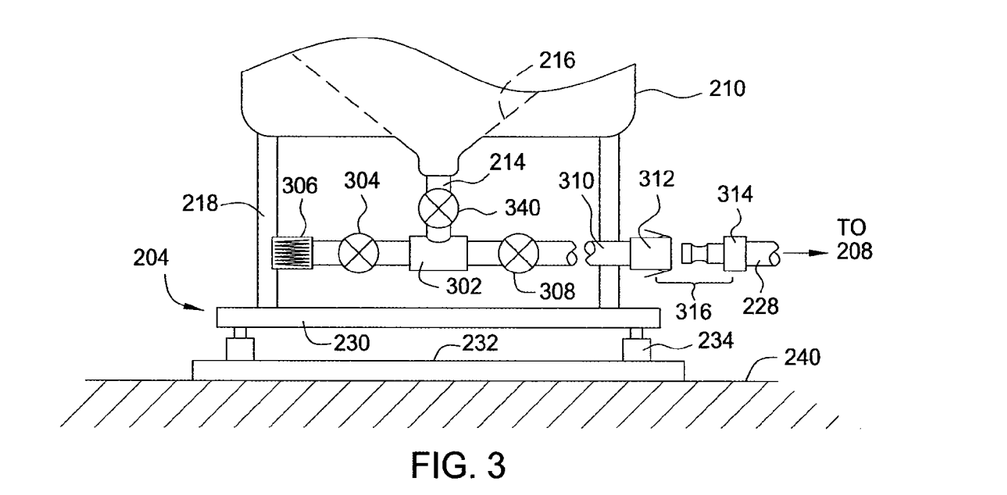
FIG. 3 is an enlarged partial elevation of a bottom section of a storage vessel of the addition system of FIG. 2.

FIG. 3 depicts an enlarged view of the storage vessel 210 illustrating one embodiment of the components utilized to couple the outlet port 214 of the storage vessel 210 to the transfer controller 208. In the embodiment depicted in FIG. 3, the tee 302 is coupled to the outlet port 214. A shut off valve 340 may be disposed between the tee 302 and the outlet port 214. A filter 306 is coupled to one port of the tee 302. The second port of the tee 302 is coupled to a conduit 310. The conduit 310 is coupled to the connector hose 228 by a connector 316. The connector 316 may be a quick disconnect or other fitting suitable for decoupling the storage vessel 210 from the FCC unit 110 so that the storage vessel 210 may be readily replaced. In one embodiment, the connector 316 has a male fitting 314 coupled to the hose 228 and a female fitting 312 coupled to the conduit 310. At least one of the hose 228 or conduit 310 may be flexible in order to facilitate alignment and coupling of the fitting 312, 314. Isolation valves 304, 308 may be disposed on either side of the tee 302 to prevent additives contained within the storage vessel 210 from inadvertently leaving the vessel, such as during shipment.

The transfer controller 208 utilizes vacuum power to transfer catalyst, fines or other material disposed in the storage vessel 210 to the FCC unit 110. The transfer controller 208 may be powered by the gas source 108, facilities air or other gas source.

Figure 4A:
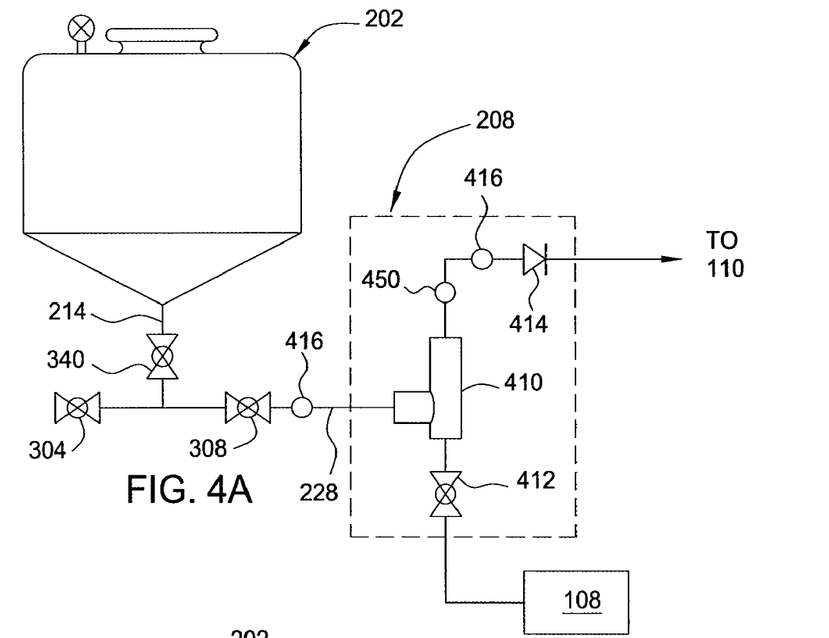
FIGS. 4A-B are schematic diagrams of alternative embodiments of a transfer controller that may be utilized in the injection system of FIG. 2.

FIG. 4A depicts one embodiment of the transfer controller 208. The transfer controller 208 generally includes an eductor 410, a control valve 412 and a check valve 414. The product inlet of the eductor 410 is coupled to the container 202 by the hose 228. The discharge of the eductor 410 is coupled to the FCC unit 110. The check valve 214 is disposed in line between the eductor 410 and the FCC unit 110 to prevent material flow from the FCC unit 110 toward the eductor 410. A third port of the eductor 410 is coupled to the gas source 108. The control valve 412 is disposed between the gas source 108 and the eductor 410. The control valve 412 controls the operation of the eductor 410 and, ultimately, the movement of material between the container 202 and the FCC unit 110. One eductor that may be adapted to benefit from the invention is available from Vortex Ventures, located in Houston, Tex.

A flow indicator 416 may be positioned between the container 202 and the transfer controller 208 to provide a metric indicative that material is being transferred from the container 202. In one embodiment, the flow indicator 416 may be a sight glass. Flow indicators 416 may be disposed in various positions in the flow path between the container 202 and the FCC unit 110 to allow visual confirmation of the system operation.

A feed back sensor 450 may be positioned between the eductor 410 and the FCC unit 110. The feed back sensor 450 provides the controller 206 with a metric indicative of additive flow between the eductor 410 and the FCC unit 110. The controller 206, in response to the metric provide by the sensor 450, may generate a flag or shut down the injection system 200 if the metric indicates improper operation, such as a clogged eductor 410. The flag electronically notify at least one of the refiner and/or catalyst vendor. The feed back sensor 450 may be a pressure transmitter or other device suitable for confirming flow to the FCC unit 110.

In another embodiment, the feed back sensor 450 may be utilized to provide the controller 450 with a metric indicative of the pressure between the eductor 410 and the FCC unit 110. The controller 450 may monitor this pressure to ensure that adequate pressure is provided so that the flow of material will always move towards the FCC unit 110. If the pressure detected by the feed back sensor 450 is too low, the controller 206 may close a valve (not shown) between the eductor 410 and the FCC unit 100 or prevent the valve 308 from opening to prevent backflow.

Figure 4B:
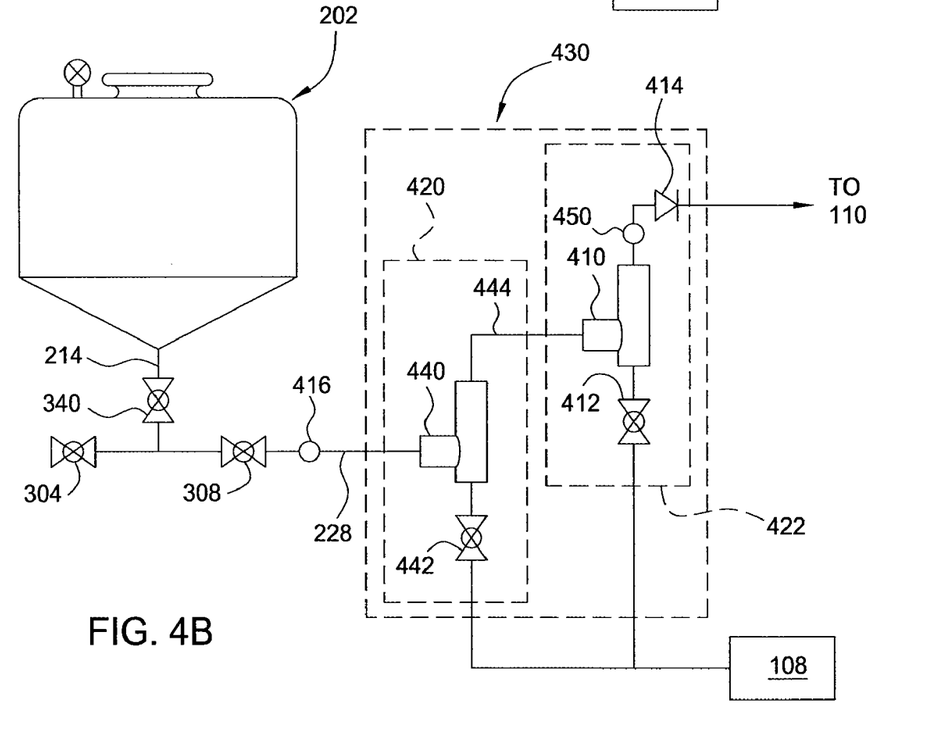

FIG. 4B depicts another embodiment of a transfer controller 430. The transfer controller 430 generally includes at least one pre-stage conveyor 420 and a final stage conveyor 422. The pre-stage conveyor 420 includes an eductor 440 and a control valve 442. The product inlet of the eductor 440 is coupled by the hose 228 to the container 202. The outlet port of the eductor 440 is coupled to the product inlet port of an eductor positioned in another pre-stage conveyor and coupled in series in one or more additional pre-stage conveyors coupled in series and terminating with the final stage conveyor 422. In the embodiment depicted in FIG. 4B, the outlet port of the pre-stage conveyor 420 is coupled by a conduit 444 to the product inlet and eductor 410 of the final stage conveyor 422. Optionally, and not shown in FIG. 4B, a check valve, such as the check valve 414, may be disposed in the conduit 444 to ensure the direction of flow from the pre-stage conveyor to the final stage conveyor 422. The final stage conveyor 422 is generally similar to the transfer controller 208 depicted in FIG. 4A, having a control valve 412 and a check valve 414 and an eductor 410. The outlet of the final stage conveyor 422 is coupled to the FCC unit 110.

Each of the conveyors 420, 422 are powered by the gas source 108 or other suitable gas source. The use of multiple conveyors 420, 422 in series as shown in the transfer controller 430 allows material to be transferred over a greater length between the container 202 and the FCC unit 110. The use of multiple conveyors 420, 422 coupled in series additionally allows the pressure in the conduits carrying the material to FCC unit 110 to be incrementally increased through each conveyor, thereby conserving energy while still pressurizing the material to a level that facilitates injection into the FCC unit 110.

Figure 5:
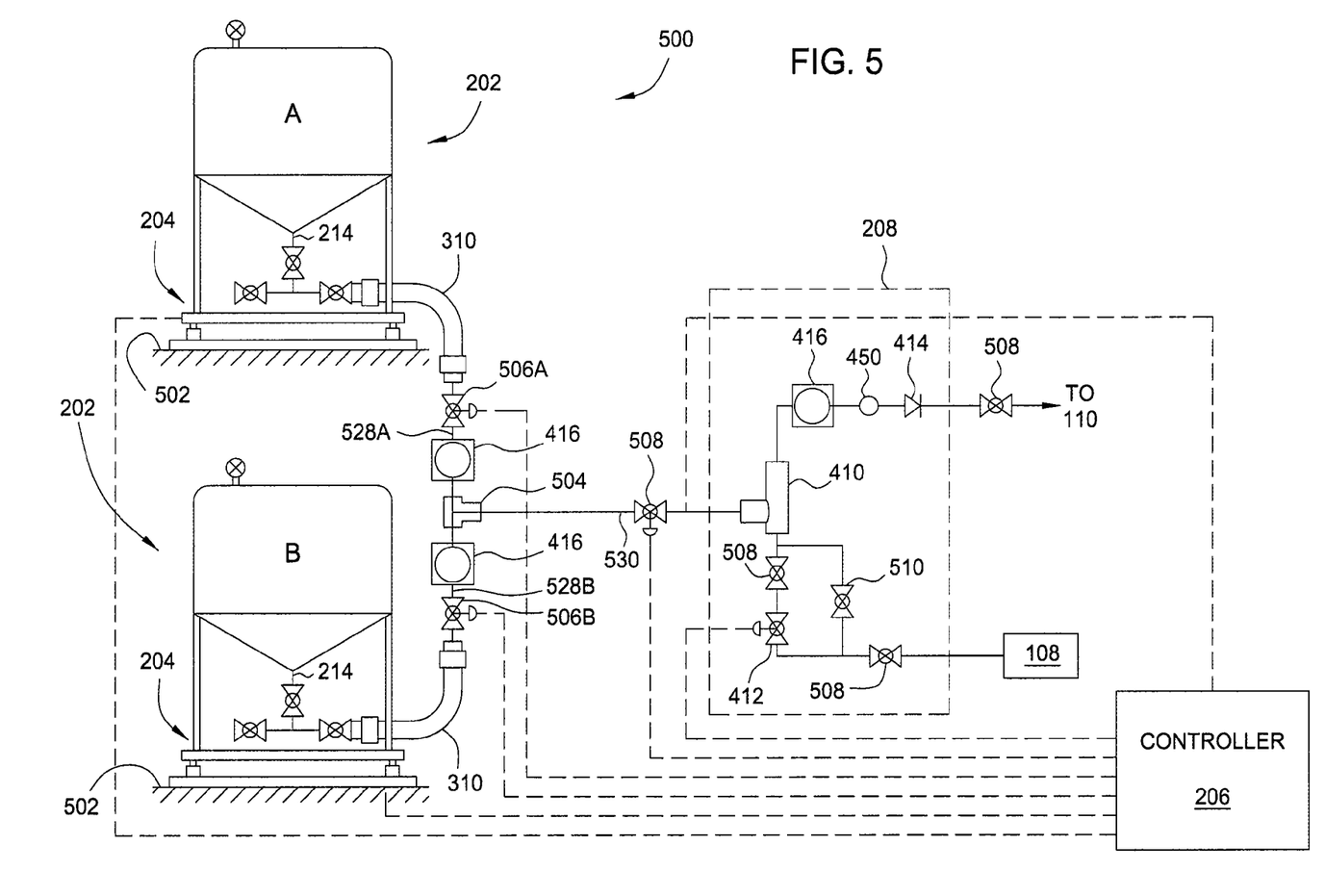
FIG. 5 is a simplified schematic diagram of another embodiment of an addition system in accordance with the present invention suitable for use with an FCC system.

FIG. 5 is a simplified schematic diagram of another embodiment of an addition system 500 in accordance with the present invention suitable for use with an FCC system. The addition system 500 includes a plurality of containers 202. In the embodiment depicted in FIG. 5, two containers 202 are shown, a first container filled with material A and a second container 202 holding material B. The containers 202 are selectively coupled to the transfer controller 208 such that a material A and/or B may be selectively added to the FCC unit 110. The containers 202 may be arranged in a horizontal or vertical orientation, such as in a vertically stacked orientation.

In the embodiment depicted in FIG. 5, a first selector valve 506A is coupled to the outlet port 214 of the container 202 carrying material A while a second selector valve 506B is coupled to the outlet port 214 of the container 202 carrying material B. The selector valves 506A, 506B are coupled by hoses 528A, 528B to a tee 504. A common line 530 couples the transfer controller 208 to the hoses 528A, 528B through the tee 504. A shut-off valve 508 may be disposed between the tee 508 and the transfer controller 208. In embodiments wherein more than two containers 202 are coupled to the common line 530, multiple tees 504 or a manifold may be utilized to couple all of the containers to the FCC unit 110 through a single common line 530. It is also contemplated that multiple group of containers 202 may be coupled to the FCC unit 110 through respective common lines 530. The transfer controller 208 may be any one of the controllers described herein or any variation thereof.

In operation, the controller 206 may provide a signal to the selector valve 506A to change an operational state of the selector valve 506A from closed to open, while a signal provided to the selector valve 506B causes the valve 506B to close (or remain closed). The controller 206 provides a signal to the control valve 412 to open, thereby causing gas to flow from the gas source 108 through the eductor 410. The flow through the eductor 410 draws material from the container 202 holding material A through the common line 530 and ultimately to the FCC unit 110. Since the control selector valve 506B is in a closed state, material B from the other container 202 is prevented from being transported to the FCC unit 110. As the material is being transferred, the weight of material A in the container 202 decreases by the amount of additive dispensed into the FCC unit 110. This change in weight is detected by the sensor 204 which provides the controller 206 with a metric indicative of the amount of material A transferred into the FCC unit 110 from the container 202. Since the material transferred from each container may be independently resolved, it is also contemplated that both selector valves 506A, 506B may be opened simultaneously to allow simultaneous transfer of material A and material B to the FCC unit.

Figure 6:
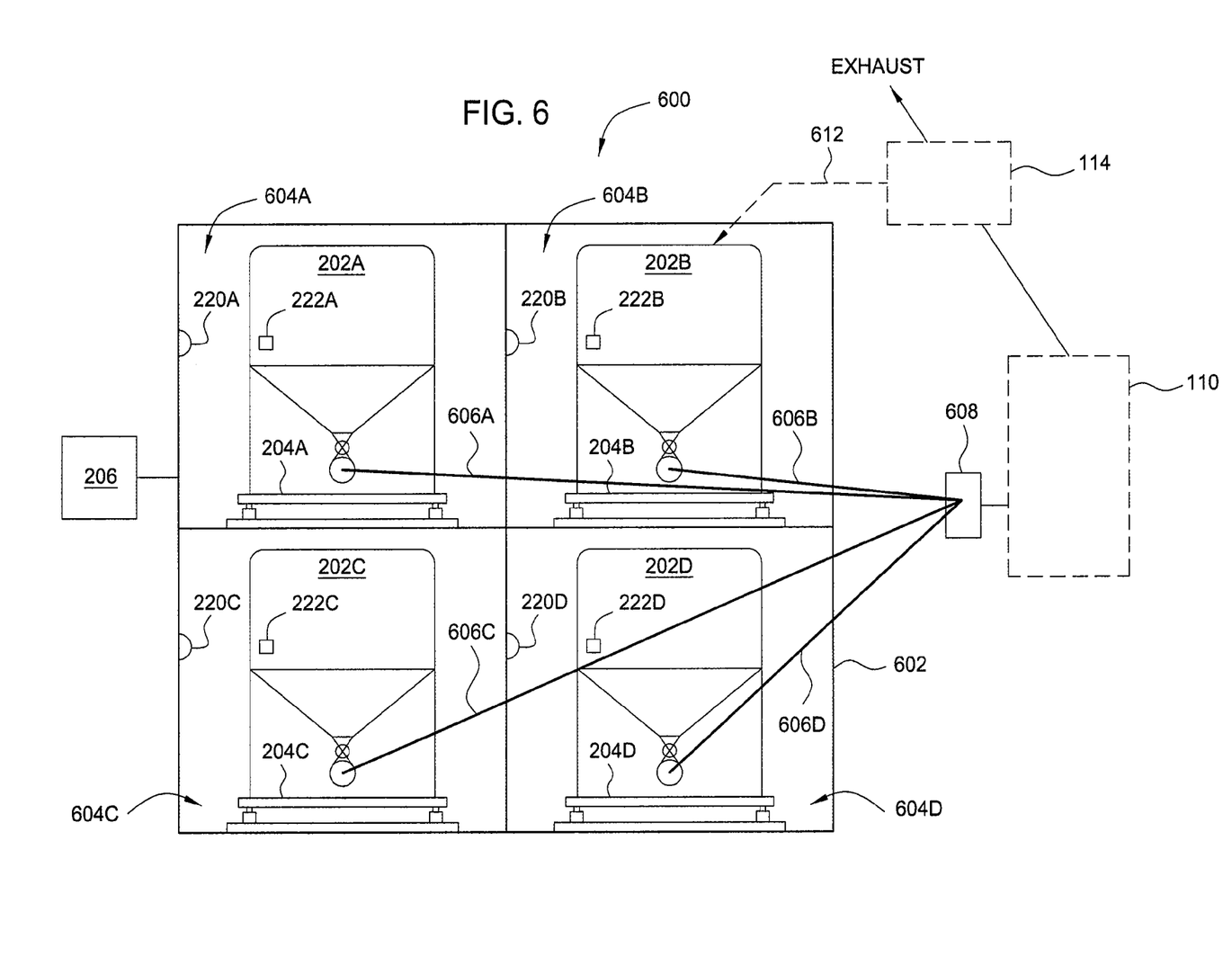
FIG. 6 is a simplified schematic diagram of another embodiment of an addition system in accordance with the present invention suitable for use with an FCC system.

FIG. 6 depicts another embodiment of an addition system 600. The addition system 600 includes a rack 602 which is configured to provide a plurality of bays, each adapted to receive a container. In the embodiment depicted in FIG. 6, four bays 604A-D are provided to house respective containers, shown as containers 202A-D. In the embodiment depicted in FIG. 6, the arrangement of bays has an equal number of columns and rows. It is also contemplated that the bays may be arranged laterally, for example, horizontally in a single row or arranged in any number of columns or rows.

Generally, different additives are provided in each of containers 202A-D, although some containers may include the same additives as the other containers. The additives may be specialized catalysts utilized for process control in the FCC unit 110. For example, additives may be provided from the addition system 600 to the FCC unit 110 to control the ratio of product types recovered in the distillation system 116 (i.e., for example, more LPG than gasoline) and/or to control the composition of emissions passing through an effluent stack of the exhaust system 114 of the regenerator 250, among other process control attributes. The main catalyst generally delivers a Y-Zeolite containing catalyst, which drives the main cracking process. One or more of the containers 202A-B may be utilized to deliver fines into the FCC unit 110 through the addition system 600. Fines may be provided from an additive supplier, or may be captured at the facility from the exhaust system 614 or other source, and may be delivered to one of the containers 202A-B via a conduit 612. Suitable additives are available from Intercat Corporation, located in Sea Girt, N.J.

Each bay 604A-D includes a sensor 204A-D and a reader 220A-D. Each sensor 204A-D is coupled to the controller 206 such that the amount of material dispensed and/or added to the respective container 202A-D interfacing with the sensor 204A-D may be monitored.

Each of the readers 220A-D are configured to provide the controller 206 with information regarding the specific container 202A-D residing in a respective bay 604A-D. Thus, in this manner, the controller 206 will know the exact material in each container disposed in the bays 604A-D so that the correct material is always dispensed into the FCC unit 110.

For example, the bay 604A may be loaded with a container 202A having SOx reduction catalyst, bay 604B may be loaded with a container 202B having catalyst fines, bay 604C is empty, while bay 604D may be loaded with a container 202D having NOx reduction catalyst. If bay 604C is planned to have a container 202C having NOx reduction catalyst loaded therein, and technicians inadvertently load a container having SOx reduction catalyst, the controller 206 would be immediately aware of the error from the information detected by the reader 220C positioned to read the tag 222 affixed to the container disposed in the bay 604C, and thereby would prevent inadvertent dispense therefrom along with flagging the error.

Moreover, the readers 220A-D allow the system 600 to correct dispense problems automatically. For example, both bay 604C and bay 604D are loaded with containers 202C-D having NOx reduction catalyst, and the controller 206 determines that a scheduled dispense from the container 202D was not made or was insufficient due to a blockage, insufficient material in the container 202D or other malfunction, the controller 206 may search the bays for another container having NOx reduction catalyst (e.g., the container 202C) and make the remaining scheduled addition of NOx reduction catalyst therefrom without interruption of processing or servicing the addition system 600.

The containers 202A-D are coupled by a hose 606A-D to a transfer controller 608. The transfer controller 608 selectively couples the containers 202A-D to the FCC unit 110. Each container 202A-D may have its own dedicated transfer controller, as shown in FIGS. 4A-B or the like, or share a transfer controller with one or more other containers.

Figure 7A:
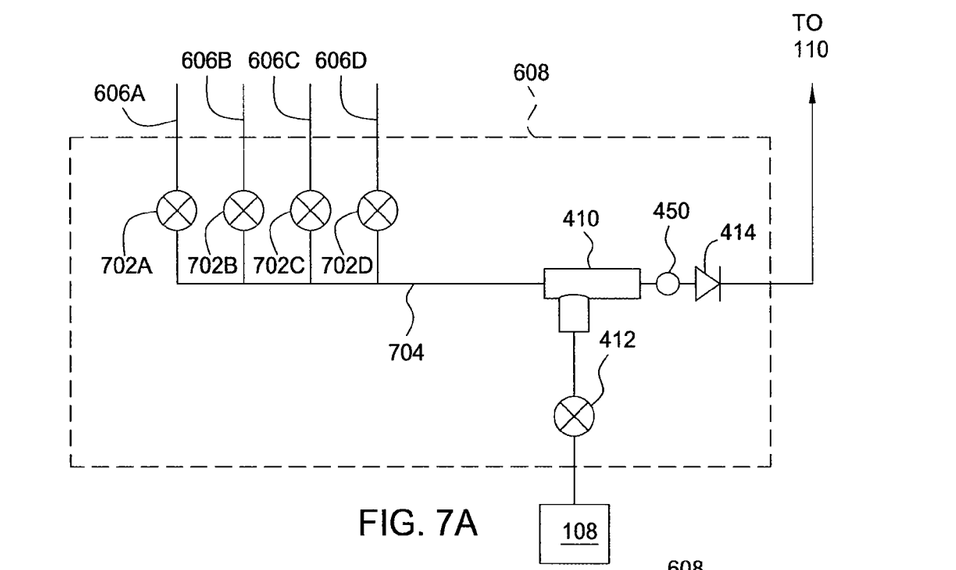
FIGS. 7A-B are simplified schematic diagrams of alternative embodiments of transfer controllers for the addition system of FIG. 6.

FIG. 7A depicts one embodiment of the transfer controller 608. The transfer controller 608 generally includes a plurality of selector valves 702A-D, each respectively coupled to one of the hoses 606A-D leading form the containers 202A-D. The outlets of the selector valves 702A-D are merged into a common line 704 by a plurality of tees or manifold. The common line 704 is coupled to one or more eductors 410. The output of the eductor 410 is coupled to the FCC unit 110. One eductor 410 is shown in FIG. 7A, but it is contemplated that staged eductors may be utilized as described with reference to FIG. 4B.

In operation, the controller 206 selectively opens one of the selector valves 702A-D to allow material to flow from a selected container or selected containers 202A-D. Control valve 412 is opened to provide gas from the source 108 through the eductor 410. The gas flowing through the eductor 410 creates a vacuum that pulls material through the common line 704, and pressurizes the material leaving the eductor 410 for delivery into the FCC unit 110.

Figure 7B:
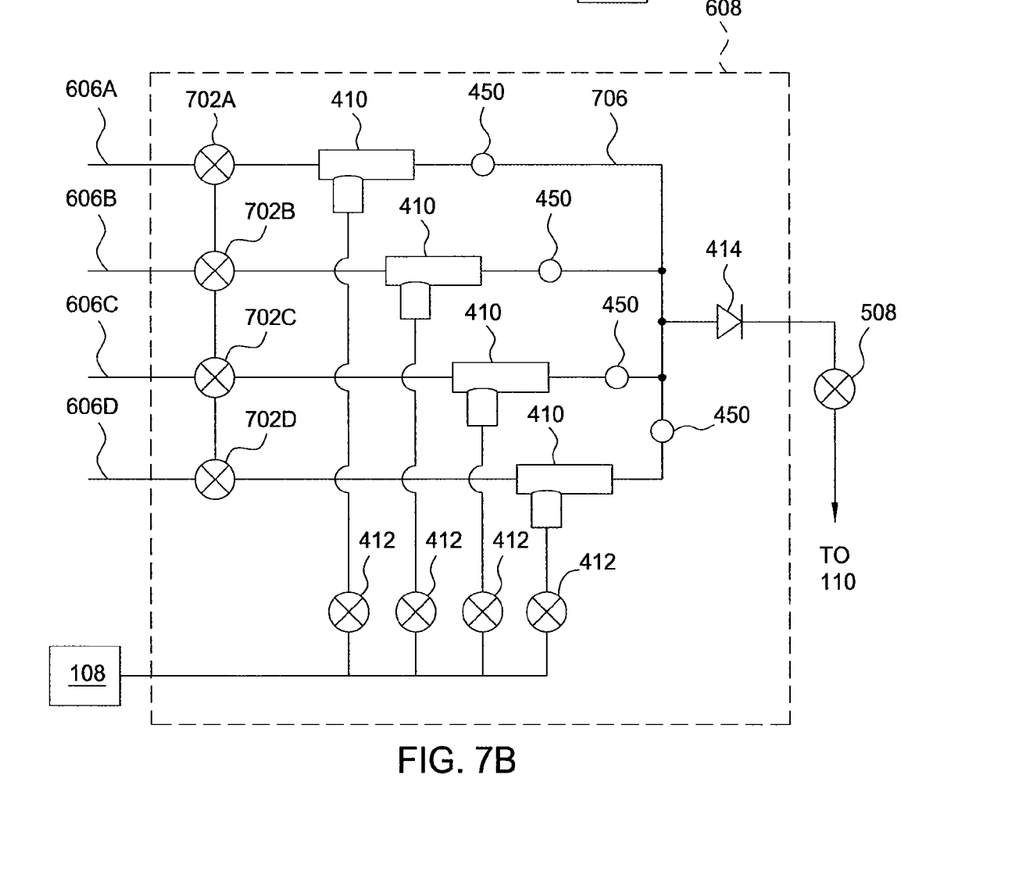

FIG. 7B depicts another embodiment of the transfer controller 608. The transfer controller 608 generally includes a plurality of selector valves 702A-D, each respectively coupled to one of the hoses 606A-D leading from the containers 202A-D. Each outlet of the selector valves 702A-D are respectively coupled to a dedicated eductor 410. The outlets of the eductors 410 are merged into a common line 706 by a plurality of tees or manifold. The common line 706 is coupled to the FCC unit 110. One eductor 410 is shown in FIG. 7B coupled between each selector valve 702A-D and the common line 706, but it is contemplated that staged eductors may be utilized between each selector valve 702A-D and the common line 706, and/or another eductor 410 (not shown) may be disposed in-line with the common line 706 to provide a staged material delivery arrangement, as described with reference to FIG. 4B.

In operation, the controller 206 selectively opens one of the selector valves 702A-D to allow material to flow from a selected container or selected containers 202A-D. A selected control valve 412 is opened to provide gas from the source 108 through the eductor 410 associated with the selected containers 202A-D. The gas flowing through the eductor 410 (or series of eductors) creates a vacuum that pulls material from the container and into the common line 706 at an elevated pressure suitable for delivery into the FCC unit 110.

Figure 8:
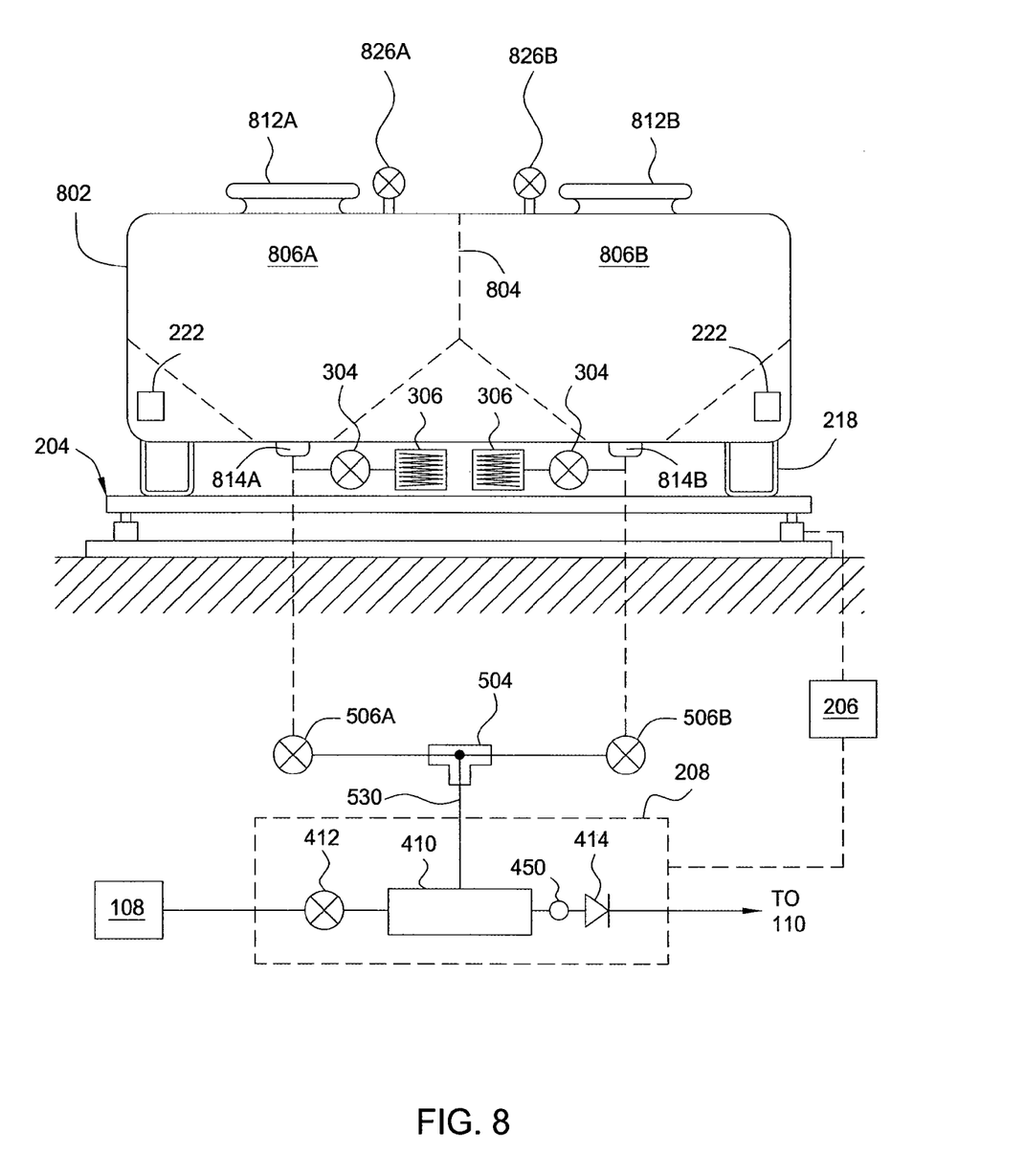
FIG. 8 is a simplified schematic diagram of another embodiment of an addition system in accordance with the present invention suitable for use with an FCC system.

FIG. 8 is a simplified schematic diagram of another embodiment of an addition system 800. The addition system 800 generally includes a container 802, a sensor 204 and a transfer controller 208. The sensor 204 and transfer controller 208 are generally as described above.

The container 802 includes a plurality of compartments. Each compartment is configured to store a different additive. In the embodiment depicted in FIG. 8, two compartments 806A, 806B are defined in the container 802. The compartments 806A, 806B are separated by an internal wall 804 to prevent mixing of the additives. The wall 804 may completely isolate the compartments 806A, 806B, or the wall 804 may terminate short of the top of the container 802 or include one or more apertures proximate the top of the container 802 so that the area above the additives disposed in each compartment 806A, 806B share a common plenum.

In the embodiment depicted in FIG. 8, the container 802 includes separate fill ports 812A, 812B and vent ports 826A, 826B for each compartment 806A, 806B. The container 802 also includes separate outlet ports 814A, 814B disposed in the bottom of the container 802 so that each additive may be dispensed from the compartments 806A, 806B separately. The outlet ports 814A, 814B are couple to selector valves 506A, 506B. The outlet ports of the valves 506A, 506B are coupled through a tee 504 to a common line 530. The common line 530 is coupled to the transfer controller 208. The controller 206, by selectively actuating the appropriate valves 506A, 506B and transfer controller 208, causes additive(s) to be transferred from the container 802 to the FCC unit 110.

The amount of additive transferred is determined using information provided by the sensor 204. If additives are transferred from both compartments 806A, 806B simultaneously, the amount of each additive transferred may be determined using the change in weight of the container 802 factored by the weight ratio of the additive in each compartment.

Returning to FIG. 2, the controller 206 is typically housed in an explosion-proof enclosure to prevent spark ignition of gases which may potentially exist on the exterior of the enclosure in a petroleum processing environment. The controller 206 may be equipped with remote access capability, such as communication port 286 (for example, a modem, wireless transmitter, communication port and the like), so that activity may be monitored from other locations by a remote device 288, such as the refinery operations center or by catalyst suppliers. A controller having such capability is described in U.S. Pat. No. 6,859,759, issued Feb. 22, 2005 and U.S. patent application Ser. No. 10/304,670, filed Nov. 26, 2002, both of which are hereby incorporated by reference in their entireties. It is contemplated that suitable controllers may have alternative configurations.

The controller 206 is provided to control the function of at least the catalyst addition system 200. The controller 206 may be any suitable logic device for controlling the operation of the addition systems described herein. The controller 206 generally includes memory 280, support circuits 282 and a central processing unit (CPU) 284, as is known.

In one embodiment, the controller 206 is a programmable logic controller (PLC), such as those available from GE Fanuc. However, from the disclosure herein, those skilled in the art will realize that other controllers such as microcontrollers, microprocessors, programmable gate arrays, and application specific integrated circuits (ASICs) may be used to perform the controlling functions of the controller 206. The controller 206 is coupled to the various support circuits 282 that provide various signals to the controller 206. These support circuits 282 may include power supplies, clocks, input and output interface circuits and the like.

The controller 206 may be utilized to cause the addition system 200 to perform a series of process steps, such as an injection method described below. The method may be stored in the memory 280 of the controller 206, or accessed by the controller 206 from another memory source.

In one embodiment, a method for injecting additives to an FCC unit begins by reading the tags 222 associated with the containers 202 interfaced with the sensors 204 and transfer controller 208 of the additive system 200. If the tag 222 of a particular container 202 does not contain or contains predefined information, the controller 206 may prevent addition from that container and/or generate a flag. The flag is generally provided to the refiner, and may also be provided to the catalyst supplier via transmission to the remote device via the controller 206. For example, if an expired lot or contaminated lot of material is present in the container 202 associated with the tag 222, the refiner and/or vendor may be notified. Moreover, in this type of event, additions from that container may be prevented by the controller by default programming, selection by the refiner, by instructions provided remotely by the vendor (or other third party) through the modem (e.g., communication port 286) to the controller.

The controller 206 generally selects a container for holding the additive which is to be dispensed into the FCC unit based on a predetermined injection schedule. The controller 206 selects a container filled with the additive called for in the injection schedule, and opens the appropriate selector valve and control valves to cause additive transfer from the container to the FCC unit through the eductor. The sensor provides the controller with a metric indicative of the amount of additive transferred, thereby enabling the controller to determine when to close the valves and terminate the addition. If the tag is read/writable, the information stored in the memory of the tag is updated.

Thus, a vacuum powered addition system and method for delivering catalyst to an FCC unit has been provided. The addition system generally provides a cost savings over conventional addition systems, as pressure vessel and vessel pressurization systems are not required. Moreover, the ability to automatically obtain information regarding the material loaded into the system, along with information regarding material dispensed from the system, allows the system to flag operator error, and to self-correct addition deficiencies, in some instances, without operator intervention. Advantageously, this allows the FCC unit to continue operating at or near processing limits with minimal fluctuation, thereby providing the desired product mix and emissions composition with minimal dis-optimisation, thereby maximizing the profitability of the FCC system refiner.

Figure 9:
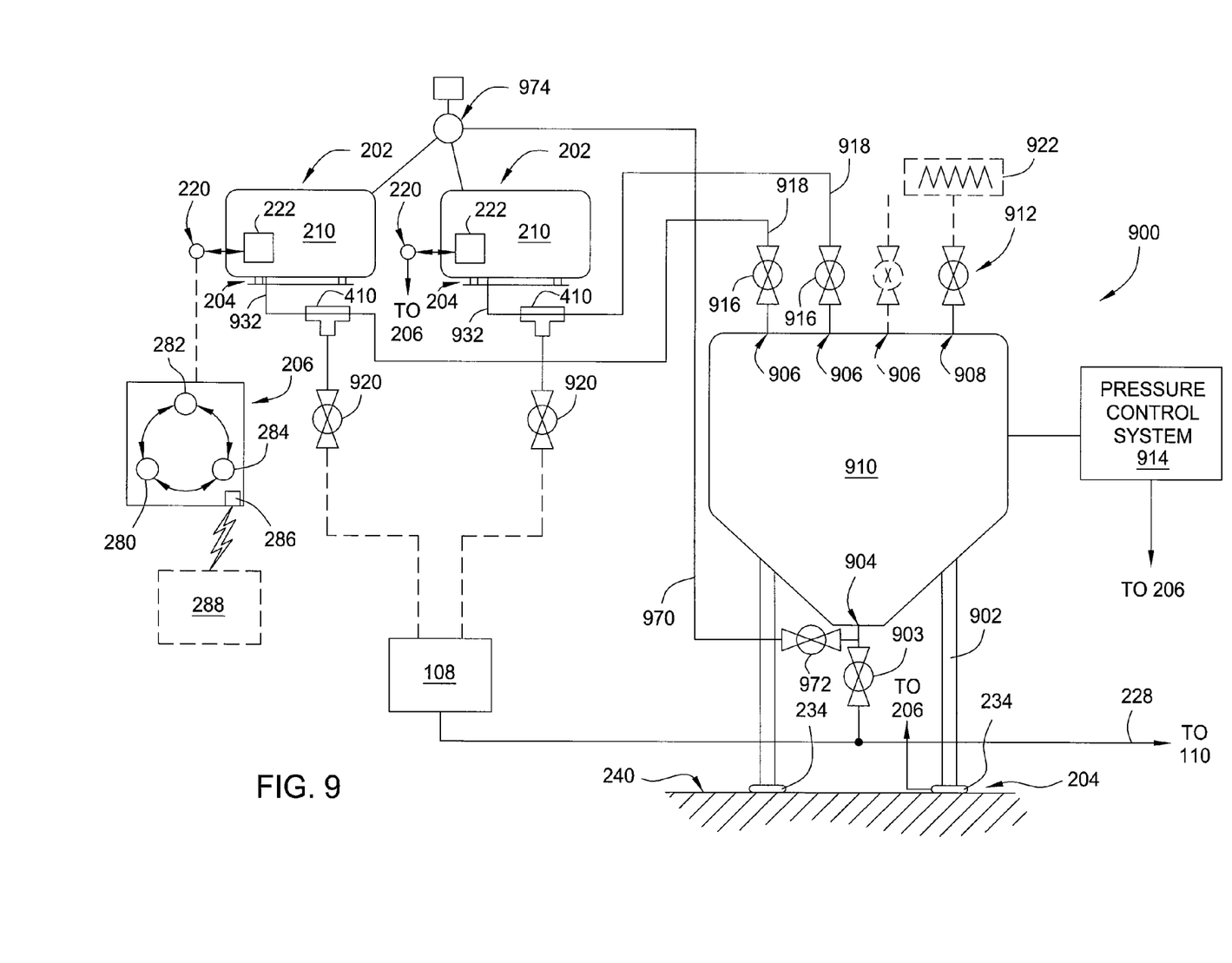
FIG. 9 is a schematic side view of another embodiment of an addition system in accordance with the present invention suitable for use with an FCC system.

FIG. 9 is a simplified schematic side view of another embodiment of an addition system 900. The addition system 900 generally includes a delivery vessel 910, a sensor 204 and a controller 206. In one embodiment, the sensor 204 (such as one or more load cells 234) and controller 206 may be generally as described above.

The vessel 910 generally stages additives prior to delivery to the FCC unit 110. The vessel 910 may be sized to hold enough additives for multiple addition cycles, or to hold a single shot of additives (e.g., the vessel 910 empties of additives each time additives are provided to the FCC unit 110). The vessel 910 includes one or more inlet ports 906 and one or more outlet ports 904. The vessel 910 may also include a vent port 908, which optionally may be coupled to a filtering device 922 to prevent fine particles from escaping the vessel 910 and entering the atmosphere surrounding the addition system 900.

The outlet port 904 is generally coupled to a valve 930 suitable for controlling the flow of additives from the vessel 910 to an FCC unit 110. The valve 930 is selectively opened in response from a signal from the controller 206 to allow additives to exit the delivery vessel 910 through the outlet port 904. The amount of additives passing through the valve 930 is monitored using the load cells 234 which provide a metric indicative of a change in weight of the vessel 910 to the controller 206 from which a metric of additives provided to the FCC unit 910 may be resolved.

In the embodiment depicted in FIG. 9, the delivery vessel 910 is illustrated as a single vessel having a generally open, contiguous interior volume. However, it is contemplated that the delivery vessel 910 may be comprised of one or more vessels. For example, the delivery vessel 910 may be comprised of one or more low pressure storage vessels coupled to a pressure vessel, wherein additives are transferred from a selected storage vessel to the pressure vessel at a low pressure, then pressurized in the pressure vessel to a level suitable for delivery to the FCC unit 110. Examples of such delivery vessels which may be adapted to benefit from the invention are described in U.S. patent application Ser. No. 10/374,450, filed Feb. 26, 2003, which is incorporated by reference in its entirety.

It is also contemplated that the delivery vessel 910 may have one or more internal compartments in which additives may be disposed without mixing. For example, the delivery vessel 910 may be comprised two or more internal compartments, each compartment having a separate fill and discharge ports, such that additives (which may be of different types)

are transferred from a storage container, such as a tote or silo, among others, into a respective compartment at a low pressure, then pressurized in the delivery vessel to a level suitable for delivery to the FCC unit 110. Examples of such delivery vessels which may be adapted to benefit from the invention are described in U.S. patent application Ser. No. 11/008,913, filed Dec. 10, 2004, and U.S. patent application Ser. No. 10/717,249, filed Nov. 19, 2003, which are incorporated by reference in their entireties.

A pressure control system 914 is coupled to the vessel 910 to control the pressure therein. In one embodiment, the pressure control system 914, in conjunction with operation of a valve 912 opening and closing the vent port 908, maintains the vessel 910 at or below atmospheric pressure during loading of additives through the inlet ports 906. Once the vessel 910 is loaded, the pressure control system 914 raises the pressure within the vessel 910 to a level suitable for providing additives to the FCC unit 110 through the metering device (e.g., valve 930). For example, the pressure control system 914 is suitable for elevating the pressure within the delivery vessel 910 to at least 15 psi, and in one embodiment, up to about 60 psi.

In the embodiment depicted in FIG. 9, each of the inlet ports 906 are coupled through valves 916 to respective containers 202. The containers 202, which have been described above, are generally portable self-contained units suitable for shipping additives from the additive supplier to the refiner. The containers 202 may be disposable or reusable. Three inlet ports 906 are shown in FIG. 9, with one port 906 depicted in phantom to indicate any number of additional optional ports. The valves 916 may be actuated between a closed state and an open state that respectively prevents and allows additives to flow between the containers 210 and the delivery vessel 910 through a delivery conduit 918.

Additives may be moved between the containers 210 and the delivery vessel 910 by gravity, mechanical actuation (e.g., screw, gear pump and the like), pressure or by providing a vacuum within the delivery vessel 910 to pull material from the containers 210. In one embodiment, additives are moved between the containers 210 and the delivery vessel 910 using an eductor 410 interfaced with the conduct 918. The eductor 410 may driven by the fluid source 108 or other suitable air supply, the flow from which is controlled by a shut-off valve 920. The vacuum generated by the eductor 410 pulls additives from the container 202 though the eductor 410. The additives leaving the eductor 410 through the conduit 918 are entrained in a pressurized stream of air which efficiently delivers the additives through the inlet port 906 and into the delivery vessel 910. Position the eductor 410 close to the container 202 allows the additives to be moved efficiently, e.g., with minimal energy consumption and cost to the refiner. Moreover, since the eductor 410 allows the pressure within the delivery vessel 910 to be maintains at atmospheric or even at an elevated pressure as only a positive pressure differential is needed to move additives between the container and vessel, a considerable amount of time, energy and cost is saved due to not having to bring the volume of the delivery vessel 910 under vacuum for additive loading and then to an elevated pressure state for additive delivery to the FCC unit 910.

The system 900 may also include one or more readers 220 positioned to interface with a tag 222 affixed to the container 202, such as a storage vessel 210 described above. The reader 220 may be coupled to the controller 206 either by downloading information form the reader memory, wireless transmission and/or hardware communication. The reader 220 and tag 222 may be as described above The reader 220 is generally positioned such that the controller 206 may determine which tag 222 the reader 220 is communicating with thereby enabling identification of the vessel 210 and it contents. In one embodiment, the reader 220 may be affixed to the conduit 918 at or near the conduits end 932 so that the controller 206 may confirm what type of additive is disposed in the storage vessel 210 as described above. Thus, by confirming the identification of the type of additives disposed in each container 202 and controlling the proper selection and addition thereof, the controller 206 may cause the delivery vessel 910 to be filled and delivery a selective type of additive with great precision and flexibility.

Optionally, the system 900 may include a return line 970 coupling the delivery vessel 910 to the containers 202. The return line 970 may be coupled to the vessel 910 at the outlet port 904, or through dedicated port that may be located at the bottom of the vessel 910. A shut-off valve 972 may be opened to remove additives from the delivery vessel 910. A diverter valve 974 or other valve arrangement may be selectively actuated to direct the flow of additives returning from the delivery vessel 910 the appropriate container 202. The return line 970 allows the delivery vessel 910 to be emptied of a first additive and be replaced by a second additive without having to inject the first additive into the FCC unit. Beneficially, expensive additives can be saved for later use while preventing situations wherein excess and/or unnecessary additions may be problematic. For example, for additives that are CO promoters, adding excess CO promoters can detrimentally result in excessive NOx emissions. Thus, by returning unneeded CO promoters to its appropriate container 202, the delivery vessel 910 becomes free for providing another type of additive to the FCC unit 110 without altering processing conditions.

Optionally, the containers 202 coupled to the delivery vessel 910 may include one or more sensors 240 for providing a metric indicative of the amount of additives transferred from the container 202 to the delivery vessel 910. In the embodiment depicted in FIG. 9, each container 202 is shown interfaced with a sensor 204 in an arrangement as described with reference to FIG. 2. In this manner, the metric provided by the sensors 204 utilized to monitor additives provided to the FCC unit 110 from the delivery vessel 910 may be cross checked to determine if one set of sensors is in error or has a drifted in output. Additionally, using sensors 204 on both the delivery vessel 910 and containers 202 provides redundancy of control for critical applications—in the event that one set of weight readings becomes unreliable, the controller 206 may default to using the properly working sensor 204 until repairs can be made. The controller 206 may also automatically provide a flag and/or contact the additive vendor, refinery operations or other suitable person in the event that a reading from one sensor 204 appears inaccurate, drifting or in need of other attention.

Although the teachings of the present invention have been shown and described in detail herein, those skilled in the art can readily devise other varied embodiments that still incorporate the teachings and do not depart from the scope and spirit of the invention.

What is claimed is:

1. An addition system for an FCC unit, comprising:
   a delivery vessel having at least one outlet port and at least a first inlet port;
   a plurality of load cells interfaced with the delivery vessel and configured to detect a change in weight of the delivery vessel;
   a first portable container coupled to the first inlet port;
   a tag associated with the first container;

a first sensor positioned to obtain a metric from the tag; and a controller configured determine information relating to an additive disposed in the first container in response to the metric obtained from the tag.

2. The system of claim 1, wherein the first container is shipping tote.

3. The system of claim 1, wherein the first sensor further comprising:

a wireless data reader coupled to the controller and positioned to provide information relating to the first container to the controller.

4. The system of claim 1, wherein the tag is read/writeable.

5. The system of claim 1, wherein the information contained on the tag further comprises:

information relating to at least one of a type of material held in the first container, an amount of material disposed in the first container, shipping weight of material disposed in the first container, a tare weight of the first container, a source or origin of material within the first container, traceability information of material in the first container, a current weight of material in the first container, information relating to a unique container identification, customer to which the first container was shipped, purchase order information and material previously held in the first container.

6. The system of claim 1, wherein the first sensor is affixed to a conduit coupling the first container to the delivery vessel.

7. The system of claim 1 further comprising:

a second portable container coupled to a second inlet port of the delivery vessel; and a tag associated with the second container, wherein the controller configured determine information relating to an additive disposed in the second container in response to the metric obtained from the tag.

8. The system of claim 7 further comprising:

a second sensor is affixed to a conduit coupling the second container to the delivery vessel, and wherein the first sensor is affixed to a conduit coupling the first container to the delivery vessel.

9. The system of claim 1, wherein the delivery vessel further comprises:

one or more low pressure storage containers and having the inlet ports; and a pressure vessel coupled to the one or more low pressure storage containers and having the outlet port.

10. The system of claim 1, wherein the delivery vessel further comprises:

a plurality of internal compartments configured to prevent mixing of additives disposed therein, each compartment associated with a unique one of the inlet ports.

* * * * *